(12) United States Patent
Zhang et al.

(10) Patent No.: US 11,225,768 B1
(45) Date of Patent: Jan. 18, 2022

(54) DRAINAGE GROUTING PIPE AND METHOD OF USE THEREOF

(71) Applicant: Zhejiang University City College, Hangzhou (CN)

(72) Inventors: Lisha Zhang, Hangzhou (CN); Binghe Li, Hangzhou (CN); Jinhong Zhang, Hangzhou (CN); Xiao Wei, Hangzhou (CN); Hongwei Ying, Hangzhou (CN); Changju Zhang, Hangzhou (CN); Yifu Sun, Hangzhou (CN); Chunyan Zhao, Hangzhou (CN)

(73) Assignee: Zhejiang University City College, Hangzhou (CN)

( * ) Notice: Subject to any disclaimer, the term of this patent is extended or adjusted under 35 U.S.C. 154(b) by 0 days.

(21) Appl. No.: 17/458,605

(22) Filed: Aug. 27, 2021

(30) Foreign Application Priority Data

Aug. 28, 2020 (CN) .......................... 202010885365.2

(51) Int. Cl.
*E02D 19/16* (2006.01)
*E02D 19/00* (2006.01)
*F16L 1/028* (2006.01)
*E02D 3/12* (2006.01)

(52) U.S. Cl.
CPC ............... *E02D 19/16* (2013.01); *E02D 3/12* (2013.01); *F16L 1/028* (2013.01); *E02D 2200/1685* (2013.01); *E02D 2250/003* (2013.01); *E02D 2300/009* (2013.01); *E02D 2300/0029* (2013.01)

(58) Field of Classification Search
CPC ......... E02D 19/16; E02D 19/18; E02D 19/20; E02D 3/12; E02D 2200/1685; E02D 2250/003; E02D 2300/0029; E02D 2300/009
See application file for complete search history.

(56) References Cited

U.S. PATENT DOCUMENTS

| | | | | |
|---|---|---|---|---|
| 4,832,535 | A * | 5/1989 | Crambes | E02D 3/12 405/266 |
| 10,669,687 | B1 * | 6/2020 | Niroumand | E02D 29/02 |
| 10,961,682 | B1 * | 3/2021 | Williams | E02D 31/10 |
| 2008/0078585 | A1 * | 4/2008 | Melegari | E02B 11/005 175/314 |

(Continued)

*Primary Examiner* — Benjamin F Fiorello
(74) *Attorney, Agent, or Firm* — W&G Law Group

(57) ABSTRACT

Provided is a drainage grouting pipe and a method of use thereof. The drainage grouting pipe comprises a perforated steel pipe, a plurality of elastic anti-filtration geotextiles, a movable stopper, and a grouting pipe. The perforated steel pipe consists of a front conical tip, a middle grouting section, a rear hole-free section, and a steel pipe seal. The middle grouting section is provided with a plurality of grouting holes. The surface of the middle grouting section of the perforated steel pipe is seamlessly, and circumferentially wrapped by the plurality of elastic anti-filtration geotextiles, and gaps are formed between adjacent elastic anti-filtration geotextiles. Firstly, the geotechnical layer is drained by a pumping system, and then the grouting position in the geotechnical layer is located and controlled by pulling out the grouting pipe to control the plunging depth of the movable stopper, thus achieving the prevention and treatment of groundwater seepage damage.

10 Claims, 2 Drawing Sheets

(56) References Cited

U.S. PATENT DOCUMENTS

| | | | | |
|---|---|---|---|---|
| 2009/0304457 A1* | 12/2009 | Shimada | ............... | C09K 17/06 |
| | | | | 405/269 |
| 2013/0333451 A1* | 12/2013 | Yegian | .................. | C09K 17/00 |
| | | | | 73/61.78 |
| 2020/0063391 A1* | 2/2020 | Nicolas | .................... | E02D 3/12 |

* cited by examiner

DRAINAGE GROUTING PIPE AND METHOD OF USE THEREOF

CROSS-REFERENCE TO RELATED APPLICATIONS

The present application claims priority to Chinese Patent Application No. 202010885365.2, filed on Aug. 28, 2020, the content of which is incorporated herein by reference in its entirety.

TECHNICAL FIELD

The present application relates to a grouting device, in particular to a drainage grouting pipe and a method of use thereof which can be used for preventing and treating engineering seepage damage caused by groundwater.

BACKGROUND

Groundwater and seepage caused by groundwater will greatly reduce the strength of soil and endanger the safety of projects. Disastrous accidents caused by a large amount of groundwater are involved in engineering construction, such as "piping" and "abrupt gush" in foundation pit engineering, which are the main forms of groundwater seepage damage and will lead to foundation pit collapse or even overall instability; in the construction of road subgrade and slope, continuous heavy rainfall may also cause collapse of subgrade and landslide of slope; groundwater will also generate buoyancy on the foundation of the building above the water level in rocks or soil layers. When the buoyancy induced by groundwater exceeds the bearing capacity of the foundation, the walls and columns structure of the basement of the building will be shear-damaged, threatening the safety of the whole building.

At present, the treatment for groundwater seepage damage is often in a format that prevention and treatment are separated, which are independent of each other. Groundwater dredging is usually carried out through engineering drainage and dewatering to prevent the occurrence of accidents due to groundwater seepage damage; when the seepage damage in the project is serious, temporarily blocking should be performed by kentledge (such as soil coverage and concrete high pressure injection) to prevent the seepage damage from expanding, and then completely treated by double slurry grouting in the area where the seepage damage occurred. The above-mentioned traditional methods for prevention and treatment of groundwater seepage damage have the following shortcomings: 1. the prevention and the treatment of groundwater seepage damage are conventionally separated, and there are no economic and feasible methods to achieve the prevention and treatment of groundwater seepage damage integrally; 2. the existing treatment method against groundwater seepage damage is expensive and time-consuming, and the subsequent removal of kentledge soil coverage will also increase the construction cost and prolong the construction period.

Therefore, to effectively prevent and manage groundwater seepage at the same time, regarding the problems of poor prevention effect, high construction cost and long construction period existed in the conventional prevention and treatment methods of groundwater seepage, a drainage grouting pipe with convenient construction and low cost is urgently needed.

SUMMARY

To overcome the abovementioned shortcomings, the present application provides a drainage grouting pipe and a method of use thereof.

The technical solution proposed by the present application to solve the technical problems is as follows:

In one aspect, the present application provides a drainage grouting pipe, comprising a perforated steel pipe, a plurality of elastic anti-filtration geotextiles, a movable stopper, and a grouting pipe; wherein, the perforated steel pipe consists of a front conical tip, a middle grouting section, a rear hole-free section, and a steel pipe seal; the middle grouting section is provided with a plurality of grouting holes;

the surface of the middle grouting section of the perforated steel pipe is seamlessly and circumferentially wrapped by the plurality of elastic anti-filtration geotextiles; gaps are formed between adjacent elastic anti-filtration geotextiles for injecting grout in the perforated steel pipe into a geotechnical layer; the elastic anti-filtration geotextile is formed by sequentially superposing an upper layer of elastic fiber composite geotextile, a middle layer of elastic nonwoven fabric, and a lower layer of elastic fiber composite geotextile; the elastic fiber composite geotextile consists of warp yarns, weft yarns and elastic fibers; the warp yarns and the weft yarns are superposed and crossed with each other forming a criss-cross pattern, and elastic fibers are woven between adjacent warp yarns and adjacent weft yarns; the warp yarns, the weft yarns and the elastic fibers are provided with pores among each other;

the grouting pipe extends into the perforated steel pipe, and its end is fixedly connected with the movable stopper in a form of a sleeve, and an outer side of the movable stopper is circumferentially wrapped by a rubber ring, through which is the movable stopper is closely attached to an inner wall of the perforated steel pipe; the movable stopper, the middle grouting section of the perforated steel pipe and the front conical tip enclose a grouting space connecting the grouting pipe, and the grouting position is located by pulling and inserting the grouting pipe;

the steel pipe seal is configured to seal the perforated steel pipe, and is provided with a central through-hole and a plurality of water holes, wherein a rubber sealing ring is attached to an inner wall of the central through-hole, and the grouting pipe passes through the central through-hole and displacement of the grouting pipe is limited by the rubber sealing ring.

Furthermore, the front conical tip is seamlessly connected with the middle grouting section by welding; the hole-free section is integrally cast with the middle grouting section.

Furthermore, grouting holes are drilled around the middle grouting section by a drilling machine. Four columns of grouting holes are symmetrically and uniformly arranged along an axial direction and distributed orthogonally in an axial direction cross section. At the same time, grouting holes opposite to one another are staggered in a cross section of the perforated steel pipe. The diameter of the grouting holes can be appropriately adjusted according to the specific grouting liquid.

Furthermore, the inner wall of the perforated steel pipe is coated with vaseline to enable the movable stopper move inside the perforated steel pipe and make it ensure water-tightness.

Furthermore, the surface of the middle grouting section of the perforated steel pipe is wrapped by the elastic anti-filtration geotextiles seamlessly, uniformly and circumferentially in a multi-section manner by hot melting, and then the elastic anti-filtration geotextiles are fixed on the surface of the perforated steel pipe by spot welding, so that the elastic anti-filtration geotextiles do not detach or translocate from the perforated steel pipe when the device is pushed into a soil layer.

Furthermore, the transverse weft yarns and elastic fibers of the elastic anti-filtration geotextiles are uniformly arranged, and the longitudinal warp yarns and elastic fibers are uniformly arranged to ensure that all pores of the elastic anti-filtration geotextiles are of a same size.

Furthermore, the elastic fiber composite geotextile is less stretchable than the elastic nonwoven fabric, and the three-layer structure of the elastic anti-filtration geotextiles is sewed together by needling or sewing, so that the elastic anti-filtration geotextiles have elasticity, and the pores will not be enlarged due to excessive stretching, which will otherwise lead to the result that mud and sand infiltrate through the elastic anti-filtration geotextiles.

Furthermore, the warp yarns, the weft yarns and the elastic fibers in the elastic fiber composite geotextile are interwoven with one another in a plane, as well as in a thickness direction, thus forming an integral structure without layering.

In another aspect, the present application provides a method of using the drainage grouting pipe, wherein the method comprises the following steps:

(1) transporting a prefabricated drainage grouting pipe to a construction site, cleaning impurities in the drainage grouting pipe by pipe blowing technology, so as to avoid blocking grouting holes and affecting the drainage grouting effect during a construction process, wiping the inner wall of the perforated steel pipe with vaseline, and plunging the movable stopper and the grouting pipe connected thereto to the front conical tip of the perforated steel pipe by using the lubrication effect between the rubber ring and the perforated steel pipe;

(2) after investigation in advance, obliquely inserting by drilling or obliquely plunging the drainage grouting pipe into the geotechnical layer of a determined seepage area; paying attention to the friction between the geotechnical layer and the elastic anti-filtration geotextiles during the process of insertion or plunging, so as to avoid the situation that the elastic anti-filtration geotextiles do not cling to the perforated steel pipe;

(3) fixedly connecting the water holes with a pumping pipe of the pumping system, and fixedly connecting the grouting pipe with the grouting pipe of a grouting system;

(4) groundwater penetrating through the elastic anti-filtration geotextiles without carrying mud or sand through the perforated steel pipe, and stating the pumping system to pump the groundwater away from the geotechnical layer through the pumping system;

(5) after finishing pumping water, performing grouting consolidation at a water seepage position, locating and controlling the grouting position in the geotechnical layer by changing the plunging depth of the movable stopper, and then controlling, by the grouting system, a grouting pressure to control a grouting speed, wherein during the grouting process, the elastic anti-filtration geotextiles, which uniformly distributed on a peripheral surface of the perforated steel pipe in multiple sections will be expanded due to the grouting pressure, and the grout is injected into the geotechnical layer from expanded gaps, so as to achieve uniform grouting of the drainage grouting pipe and good grouting effect;

(6) after finishing grouting consolidation, the drainage grouting pipe is slowly pulled out of the geotechnical layer, wherein during the pulling process, the grouting pressure needs to be appropriately reduced, but grouting continues; until the drainage grouting pipe is completely pulled out, the grouting is stopped;

(7) conduct curing after grouting is completed, and resume engineering construction after the completion of seepage control.

Furthermore, in the step (5), the grouting pressure is determined by a natural gravity y of soil and a grouting depth h.

Compared with the prior art, the present application has the following advantages:

1. In the present application, from the front end of the middle grouting section, every two adjacent grouting holes in each row are wrapped by a circle of elastic anti-filtration geotextiles with a certain interval between each circle of elastic geotextiles, so as to ensure that the groundwater does not carry mud and sand and is pumped out of the geotechnical layer through the elastic anti-filtration geotextiles by the pumping system. The grout passes through the grouting hole, expands the elastic anti-filtration geotextiles due to the existence of the grouting pressure, and successfully spurts out of the gap between the perforated steel pipe and the elastic anti-filtration geotextile. The grout diffuses into cracks or pores, making the rock-soil body a new structure with high strength, good impermeability and high stability. The drainage grouting pipe provided by the present application can achieve prevention and treatment of groundwater seepage damage at the same time, which is safe, reliable, practical and efficient, and thus has broad construction application prospects.

2. According to the present application, the grouting position in the geotechnical layer can be located and controlled by pulling the grouting pipe outwards controlling the plunging depth of the movable stopper, so that positioning grouting in the geotechnical layer can be achieved, and the grouting work can be completed more efficiently; it can also prevent the grouting disqualification problem due to the pressure difference caused by the different depths of the drainage grouting pipe inserted into the rock stratum.

3. The grout is evenly distributed around the perforated steel pipe body along the axial direction, which is beneficial to reduce the adverse effects caused by opening on perforated steel pipe on the one hand, and can perform pumping and grouting operations more efficiently on the other hand, thereby achieving remarkable prevention and treatment effects.

4. The elastic geotextile in the present application is fixed on the surface of the perforated steel pipe by spot welding, so that it will not detach or translocate from the perforated steel pipe when the device is pushed into the soil layer, and the front end is conical pointed, which can be easily pushed into the soil layer without affecting the contact surface between the elastic anti-filtration geotextile and the steel pipe; the present application adopts a perforated steel pipe with strong adaptability and high strength, and thus can adapt to complex working conditions in different construction sites.

5. The multi-section elastic anti-filtration geotextile adopted in the present application can increase the penetration of grout per minute during the grouting process, improve the construction efficiency and shorten the construction period.

6. The steel pipe seal adopted in the present application can prevent groundwater from leaking out of the perforated steel pipe when pumping water. The through-hole located in the center of the steel pipe seal limits the displacement of the grouting pipe, ensuring the normal operation of the drainage grouting pipe; and the steel pipe seal can stand the pressure generated when inserting by drilling or obliquely pushing the drainage grouting pipe.

7. The drainage grouting pipe adopted in the present application can fully save the construction cost and shorten the construction time, the effect of which is much better than that of the conventional prevention and treatment method of groundwater seepage.

8. Common materials and shapes are adopted in the present application, batch production of the drainage positioning grouting pipes can be readily achieved. The present application can facilitate construction, and can be applied to the prevention and treatment of groundwater seepage damage in various projects such as foundation pit engineering, road subgrade and slope engineering, etc.

DESCRIPTION OF EMBODIMENTS

The present application will be further explained with reference to drawings and examples.

Figure 1:
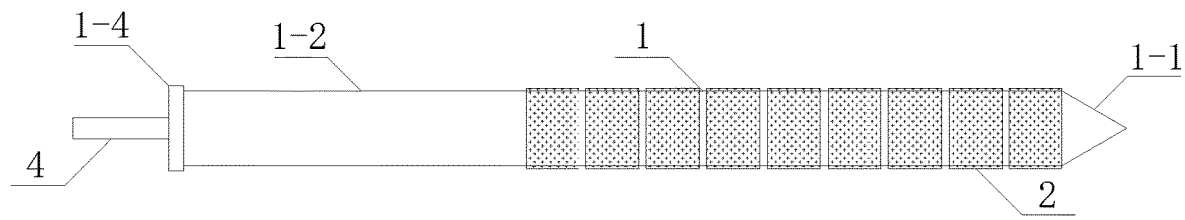
FIG. 1 presents a side view of a drainage grouting pipe according to the present application.

As shown in FIG. 1, a drainage grouting pipe provided by this embodiment includes a perforated steel pipe 1, a plurality of elastic anti-filtration geotextiles 2, and a grouting pipe 4; the perforated steel pipe 1 consists of a front conical tip 1-1, a middle grouting section, a rear hole-free section 1-2, and a steel pipe seal 1-4;

the surface of the middle grouting section of the perforated steel pipe 1 is seamlessly and circumferentially wrapped by the plurality of elastic anti-filtration geotextiles 2, and the elastic anti-filtration geotextiles 2 are fixed on the surface of the perforated steel pipe by spot welding; the thickness of the elastic anti-filtration geotextiles is the same as that of ordinary filter geotextiles, and they are evenly distributed on the peripheral surface of the perforated steel pipe body in multiple sections; there are gaps between adjacent elastic anti-filtration geotextiles 2, which are used for injecting grout in the perforated steel pipe 1 into the geotechnical layer.

Specifically, the front conical tip 1-1 is seamlessly connected with the middle grouting section by welding, and can be pushed into the geotechnical layer more conveniently; the hole-free section 1-2 is integrally cast with the middle grouting section, so that the grout will not overflow from the part exposed outside the geotechnical layer during grouting.

The inner wall of the perforated steel pipe 1 is coated with vaseline to help the movable stopper 3 move inside the perforated steel pipe and make it watertight. The vaseline has lubricity and watertightness, can help the movable stopper 3 move in the perforated steel pipe 1, and provides sealability between the movable stopper 3 and the perforated steel pipe 1 after positioning.

Figure 2:
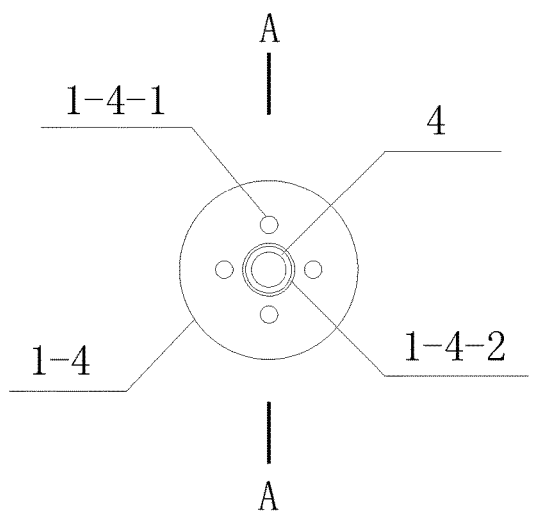
FIG. 2 presents a top view of a drainage grouting pipe according to the present application.

As shown in FIG. 2, it is a top view of the drainage grouting pipe. The steel pipe seal 1-4 is configured to seal the perforated steel pipe 1, and is provided with a central through-hole and several water holes 1-4-1. The diameter and distribution number of the water holes 1-4-1 are determined by the diameters of the perforated steel pipe 1 and grouting pipe 4. The inner wall of the central through-hole is sleeved with a rubber sealing ring 1-4-2, the grouting pipe 4 passes through the central through-hole, and the displacement of the grouting pipe 4 is limited by the rubber sealing ring 1-4-2; the steel pipe seal 1-4 also bears the pressure generated when the drainage grouting pipe is inserted or pushed obliquely.

Figure 3:
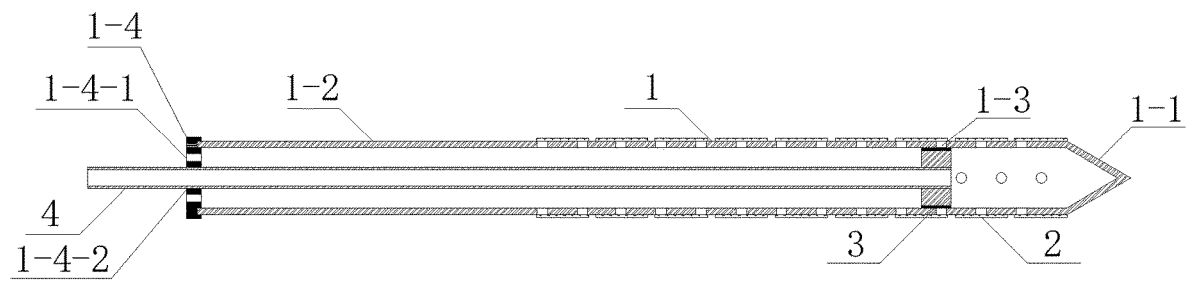
FIG. 3 presents a section AA of FIG. 2.

As shown in FIG. 3, the middle grouting section is provided with a plurality of grouting holes 1-3; the grouting pipe 4 extends into the perforated steel pipe 1, and its end is fixedly connected with the movable stopper 3 in the form of a sleeve, and the outer side of the movable stopper 3 is circumferentially wrapped by a rubber ring. When the movable stopper 3 is moved, it is more convenient for the movable stopper 3 to move due to the wrapping of the rubber ring and the effect of vaseline coated on the inner wall of the perforated steel pipe 1, and it is closely attached to the inner wall of the perforated steel pipe 1 through the rubber ring. The movable stopper 3, the middle grouting section of the perforated steel pipe 1 and the front conical tip 1-1 surround to form a grouting space connecting the grouting pipe 4, and the grouting position is located by pulling and inserting the grouting pipe 4. After the grouting pipe 4 is pulled out to form the grouting space, by adjusting the grouting pressure, the grout can be smoothly ejected from the gap between the perforated steel pipe and the elastic anti-filtration geotextile through the grouting hole due to the existence of the grouting pressure, and the grout diffuses into cracks or pores.

Specifically, grouting holes 1-3 are drilled around the middle grouting section through a drilling machine, and four columns of grouting holes 1-3 are symmetrically and evenly arranged along the axial direction and are distributed orthogonally in the axial direction cross section. Meanwhile, every two opposite grouting holes 1-3 are distributed in a staggered manner on the cross section of the perforated steel pipe 1, and the diameter of the grouting holes can be appropriately adjusted according to the specific grouting liquid.

Figure 4:
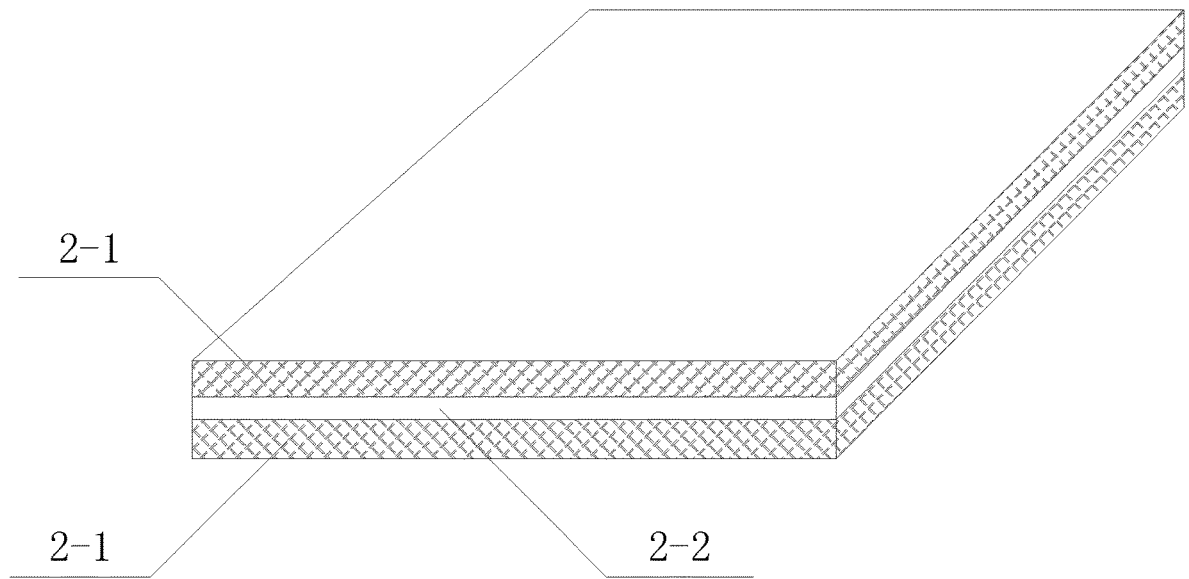
FIG. 4 presents a schematic structural diagram of elastic anti-filtration geotextiles.

As shown in FIG. 4, the elastic anti-filtration geotextiles 2 are formed by sequentially superposing three layers of an upper elastic fiber composite geotextile 2-1, an elastic non-woven fabric 2-2 and a lower elastic fiber composite geotextile 2-1.

Figure 5:
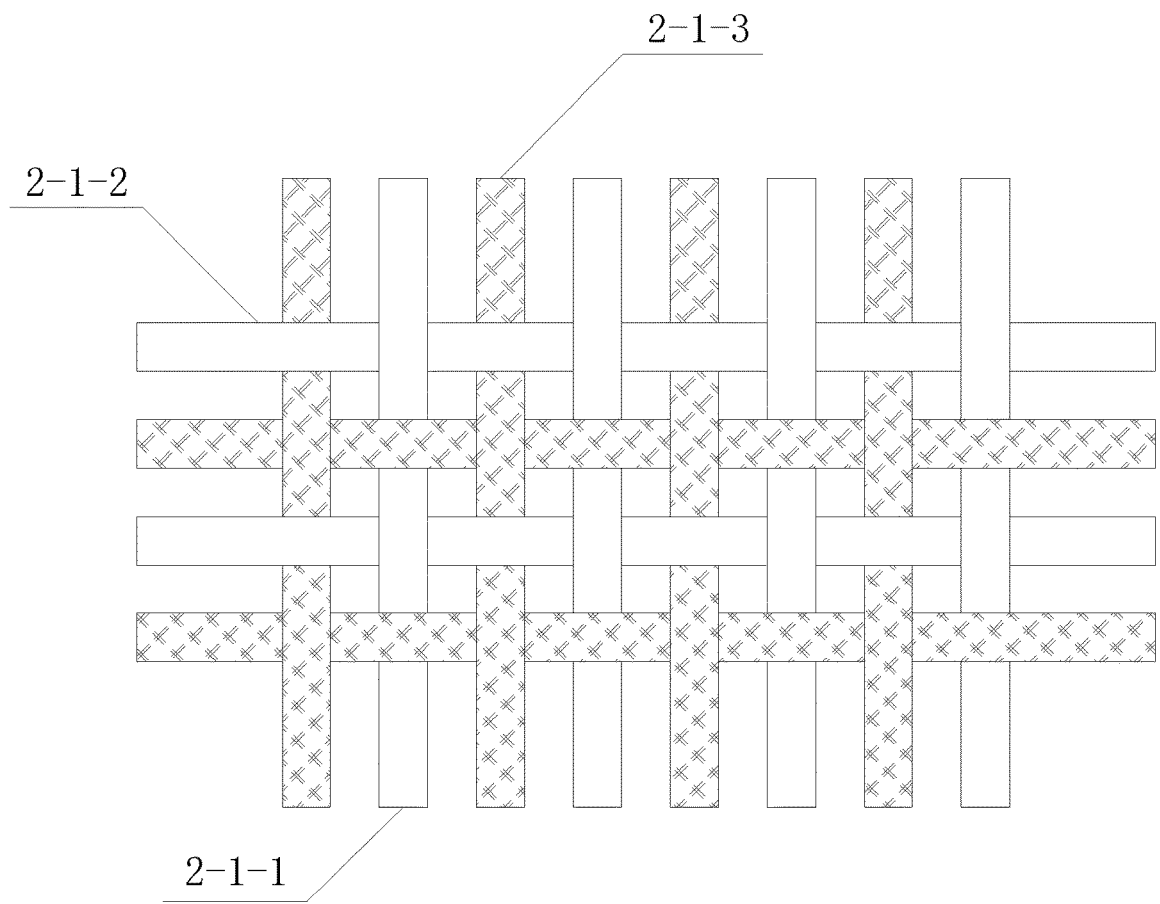
FIG. 5 presents a schematic diagram of the weaving mode of the elastic fiber composite geotextiles;
Reference signs: perforated steel pipe 1, front conical tip 1-1, rear hole-free section 1-2, grouting hole 1-3, steel pipe seal 1-4, water hole 1-4-1, rubber sealing ring 1-4-2, elastic anti-filtration geotextile 2, elastic fiber composite geotextile 2-1, warp yarn 2-1-1, weft yarn 2-1-2, elastic fiber 2-1-3, elastic non-woven fabric 2-2, movable stopper 3 and grouting pipe 4.

As shown in FIG. 5, the elastic fiber composite geotextile 2-1 is composed of warp yarns 2-1-1, weft yarns 2-1-2 and elastic fibers 2-1-3; the warp yarns 2-1-1 and the weft yarns 2-1-2 are superposed and crossed with each other to form a tic-tac-toe structure, and the elastic fibers 2-1-3 are woven between adjacent warp yarns 2-1-1 and between adjacent weft yarns 2-1-2; the warp yarns 2-1-1, the weft yarns 2-1-2 and the elastic fibers 2-1-3 are provided with pores between each other. The warp yarns 2-1-1 and weft yarns 2-1-2 can be made by the following method: using polymer (such as rubber) as a raw material, drawing the polymer into the form of yarns by raising the temperature to achieve warp yarns and weft yarns. The elastic non-woven fabric 2-2 can be made by the following method: adding elastic master batch to chemical fibers as a raw material, and chemically or hot-melt bonding to provide non-woven fabric with the functions of water permeability and sand filtration as well as elasticity.

Specifically, the surface of the middle grouting section of the perforated steel pipe 1 are wrapped by the elastic anti-filtration geotextiles 2 seamlessly and uniformly in a multi-section manner by hot melting technology, and then the elastic anti-filtration geotextiles 2 are fixed on the surface of the perforated steel pipe 1 by spot welding, so that it will not detach or translocate from the perforated steel pipe 1 when the device is pushed into the soil layer, thus ensuring that the drainage grouting pipe can work normally.

Specifically, the transverse weft yarns and elastic fibers of the elastic anti-filtration geotextiles are uniformly arranged, and the longitudinal warp yarns and elastic fibers are uniformly arranged to ensure that all pores of the elastic anti-filtration geotextiles are of a same size, so that mud and sand cannot penetrate the elastic anti-filtration geotextile due to different pore sizes during the working process.

Specifically, the elastic fiber composite geotextile is less stretchable than the elastic nonwoven fabric, and the three-layer structure of the elastic anti-filtration geotextiles is sewed together by needling or sewing, so that the elastic anti-filtration geotextiles have elasticity, and the pores will not be enlarged due to excessive stretching, which will otherwise lead to the result that mud and sand infiltrate through the elastic anti-filtration geotextiles.

Specifically, the warp yarns, the weft yarns and the elastic fibers in the elastic fiber composite geotextile are interwoven with one another in a plane, as well as in a thickness direction, thus forming an integral structure without layering.

The method of using the drainage grouting pipe includes comprises the following steps:

(1) transporting a prefabricated drainage grouting pipe to a construction site, cleaning impurities in the drainage grouting pipe by pipe blowing technology, so as to avoid blocking grouting holes 1-3 and affecting the drainage grouting effect during a construction process, wiping the inner wall of the perforated steel pipe 1 with vaseline, and plunging the movable stopper 3 and the grouting pipe 4 connected thereto to the front conical tip (1-1) of the perforated steel pipe 1 by using the lubrication effect between the rubber ring and the perforated steel pipe 1, to ensure that pumping operation can be carried out first for all grouting holes in the middle grouting section;

(2) after investigation in advance, obliquely inserting by drilling or obliquely plunging the drainage grouting pipe into the geotechnical layer of a determined seepage area;

paying attention to the friction between the geotechnical layer and the elastic anti-filtration geotextiles 2 during the process of insertion or plunging, so as to avoid the situation that the elastic anti-filtration geotextiles 2 do not cling to the perforated steel pipe 1, to ensure that the drainage grouting pipe can work normally;

(3) fixedly connecting the water holes 1-4-1 with a pumping pipe of the pumping system, and fixedly connecting the grouting pipe 4 with the grouting pipe of a grouting system;

(4) groundwater penetrating through the elastic anti-filtration geotextiles 2 without carrying mud or sand through the perforated steel pipe 1, and stating the pumping system to pump the groundwater away from the geotechnical layer through the pumping system;

(5) after finishing pumping water, performing grouting consolidation process at a water seepage position, locating and controlling the grouting position in the geotechnical layer by changing the plunging depth of the movable stopper 3, and then controlling, by the grouting system, a grouting pressure to control a grouting speed, wherein, during the grouting process, the elastic anti-filtration geotextiles 2, which uniformly distributed on a peripheral surface of the perforated steel pipe (1) in multiple sections will be expanded due to the grouting pressure, and the grout is injected into the geotechnical layer from expanded gaps, so that the drainage grouting pipe has uniform grouting and good grouting effect, and the rock-soil body becomes a new structure with high strength, good impermeability and high stability; wherein, the grouting pressure can be determined by the natural gravity y of soil and the grouting depth h;

(6) after finishing grouting consolidation, the drainage grouting pipe is slowly pulled out of the geotechnical layer, wherein during the pulling process, the grouting pressure needs to be appropriately reduced, but grouting continues; until the drainage grouting pipe is completely pulled out, the grouting is stopped, so that the grout fills the hole generated by the drilling insertion or oblique plunging of the drainage grouting pipe;

(7) conduct curing after grouting is completed, and resume engineering construction after the completion of seepage damage treatment is confirmed.

The technical principle of the present application has been described above in combination with specific embodiments. These descriptions are only for the purpose of explaining the principles of the present application, and cannot be interpreted as limiting the scope of protection of the present application in any way. Based on the explanation here, those skilled in the art can conceive of other specific embodiments of the present application without creative labor, and all such modes will fall within the protection scope of the present application.

What is claimed is:

1. A drainage grouting pipe, comprising a perforated steel pipe (1), a plurality of elastic anti-filtration geotextiles (2), a movable stopper (3) and a grouting pipe (4), wherein the perforated steel pipe (1) consists of a front conical tip (1-1), a middle grouting section, a rear hole-free section (1-2) and a steel pipe seal (1-4), and the middle grouting section is provided with a plurality of grouting holes (1-3);

a surface of the middle grouting section of the perforated steel pipe (1) is seamlessly and circumferentially wrapped by the plurality of elastic anti-filtration geotextiles (2); gaps are formed between adjacent elastic anti-filtration geotextiles (2) for injecting grout in the perforated steel pipe (1) into a geotechnical layer of concern; the elastic anti-filtration geotextile (2) is formed by sequentially superposing an upper layer of elastic fiber composite geotextile (2-1), a middle layer of elastic nonwoven fabric (2-2), and a lower layer of elastic fiber composite geotextile (2-1); the elastic fiber composite geotextile (2-1) consists of warp yarns (2-1-1), weft yarns (2-1-2), and elastic fibers (2-1-3); the warp yarns (2-1-1) and the weft yarns (2-1-2) are superposed and crossed with each other forming a criss-cross pattern, and elastic fibers (2-1-3) are woven between adjacent warp yarns (2-1-1) and between adjacent weft yarns (2-1-2); the warp yarns (2-1-1), the weft yarns (2-1-2) and the elastic fibers (2-1-3) are provided with pores between each other;

the grouting pipe (4) extends into the perforated steel pipe (1), and its end is fixedly connected with the movable stopper (3) in a form of a sleeve, and an outer side of the movable stopper (3) is circumferentially wrapped by a rubber ring, through which is the movable stopper (3) is closely attached to an inner wall of the perforated steel pipe (1); the movable stopper (3), the middle grouting section of the perforated steel pipe (1), and the front conical tip (1-1) enclose a grouting space communicated with the grouting pipe (4), and the grouting position is located by pulling and inserting the grouting pipe (4);

the steel pipe seal (1-4) is configured to seal the perforated steel pipe (1), and is provided with a central through-hole and a plurality of water holes (1-4-1), wherein a rubber sealing ring (1-4-2) is attached to the inner wall of the central through-hole, and the grouting pipe (4) passes through the central through-hole and displacement of the grouting pipe (4) is limited by the rubber sealing ring (1-4-2).

2. The drainage grouting pipe according to claim 1, wherein the front conical tip (1-1) is seamlessly connected with the middle grouting section by welding, and the hole-free section (1-2) is integrally cast with the middle grouting section.

3. The drainage grouting pipe according to claim 1, wherein grouting holes (1-3) are drilled around the middle grouting section by a drilling machine, four columns of grouting holes (1-3) are symmetrically and uniformly arranged along an axial direction and distributed orthogonally in the axial direction cross section, and at the same time, every two opposite grouting holes (1-3) are staggered in a cross section of the perforated steel pipe (1).

4. The drainage grouting pipe according to claim 1, wherein the inner wall of the perforated steel pipe (1) is coated with petroleum jelly to enable the movable stopper (3) move inside and to ensure watertightness.

5. The drainage grouting pipe according to claim 1, wherein the surface of the middle grouting section of the perforated steel pipe (1) is wrapped by the elastic anti-filtration geotextiles (2) seamlessly, uniformly and circumferentially in a multi-section manner by hot melting, and then the elastic anti-filtration geotextiles (2) are fixed on the surface of the perforated steel pipe (1) by spot welding, so that the elastic anti-filtration geotextiles (2) do not detach or translocate from the perforated steel pipe (1) when the device is pushed into a soil layer.

6. The drainage grouting pipe according to claim 1, wherein the transverse weft yarns (2-1-2) and elastic fibers (2-1-3) of the elastic anti-filtration geotextiles (2) are uniformly arranged, and the longitudinal warp yarns (2-1-1) and elastic fibers (2-1-3) are uniformly arranged to ensure that all pores of the elastic anti-filtration geotextiles are of a same size.

7. The drainage grouting pipe according to claim 1, wherein the elastic fiber composite geotextile (2-1) is less stretchable than the elastic nonwoven fabric (2-2), and the three-layer structure of the elastic anti-filtration geotextiles is sewed together by needling or sewing, so that the elastic anti-filtration geotextiles have elasticity, and the pores will not be enlarged due to excessive stretching, which will otherwise lead to the result that mud and sand infiltrate through the elastic anti-filtration geotextiles.

8. The drainage grouting pipe according to claim 1, wherein the warp yarns (2-1-1), the weft yarns (2-1-2) and the elastic fibers (2-1-3) in the elastic fiber composite geotextile (2-1) are interwoven with one another in a plane, as well as in a thickness direction, thus forming an integral structure without layering.

9. A method of using the drainage grouting pipe according to claim 1, wherein the method comprises the following steps:
   (1) transporting a prefabricated drainage grouting pipe to a construction site, cleaning impurities in the drainage grouting pipe by pipe blowing technology, so as to avoid blocking grouting holes (1-3) and affecting the drainage grouting effect during a construction process, wiping the inner wall of the perforated steel pipe (1) with petroleum jelly, and plunging the movable stopper (3) and the grouting pipe (4) connected thereto to the front conical tip (1-1) of the perforated steel pipe (1) by using the lubrication effect between the rubber ring and the perforated steel pipe (1);
   (2) after investigation in advance, obliquely inserting by drilling or obliquely plunging the drainage grouting pipe into the geotechnical layer of a determined seepage area; paying attention to the friction between the geotechnical layer and the elastic anti-filtration geotextiles (2) during the process of insertion or plunging, so as to avoid the situation that the elastic anti-filtration geotextiles (2) do not cling to the perforated steel pipe (1);
   (3) fixedly connecting the water holes (1-4-1) with a pumping pipe of the pumping system, and fixedly connecting the grouting pipe (4) with the grouting pipe of a grouting system;
   (4) groundwater penetrating through the elastic anti-filtration geotextiles (2) without carrying mud or sand through the perforated steel pipe (1), and stating the pumping system to pump the groundwater away from the geotechnical layer through the pumping system;
   (5) after finishing water pumping, performing grouting consolidation process at a water seepage position, locating and controlling the grouting position in the geotechnical layer by changing the plunging depth of the movable stopper (3), and then controlling, by the grouting system, a grouting pressure to control a grouting speed, wherein, during the grouting process, the elastic anti-filtration geotextiles (2), which uniformly distributed on a peripheral surface of the perforated steel pipe (1) in multiple sections, will be expanded due to the grouting pressure, and the grout is injected into the geotechnical layer from expanded gaps, so as to achieve uniform grouting of the drainage grouting pipe;
   (6) after finishing grouting consolidation, the drainage grouting pipe is slowly pulled out of the geotechnical layer, wherein during the pulling process, the grouting pressure needs to be appropriately reduced, but grouting continues; until the drainage grouting pipe is completely pulled out, the grouting is stopped;
   (7) conduct curing after grouting is completed, and resume engineering construction after the completion of seepage damage treatment is confirmed.

10. The method according to claim 9, wherein in the step (5), the grouting pressure is determined by a natural gravity y of soil and a grouting depth h.

\* \* \* \* \*